(12) United States Patent
Hayashi

(10) Patent No.: US 10,203,265 B2
(45) Date of Patent: Feb. 12, 2019

(54) OPTICAL FIBER EVALUATION METHOD AND OPTICAL FIBER EVALUATION DEVICE

(71) Applicant: SUMITOMO ELECTRIC INDUSTRIES, LTD., Osaka-shi, Osaka (JP)

(72) Inventor: Tetsuya Hayashi, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/658,642

(22) Filed: Jul. 25, 2017

(65) Prior Publication Data

US 2018/0038769 A1 Feb. 8, 2018

(30) Foreign Application Priority Data

Aug. 5, 2016 (JP) .................................. 2016-154613

(51) Int. Cl.
*G02B 6/02* (2006.01)
*G01M 11/00* (2006.01)

(52) U.S. Cl.
CPC ............ *G01M 11/35* (2013.01); *G01M 11/31* (2013.01); *G01M 11/33* (2013.01); *G02B 6/02042* (2013.01)

(58) Field of Classification Search
None
See application file for complete search history.

(56) References Cited

U.S. PATENT DOCUMENTS

| | | | | |
|---|---|---|---|---|
| 2009/0231682 A1* | 9/2009 | Kashyap | ............. | G01M 11/319 359/341.1 |
| 2011/0222052 A1* | 9/2011 | Sengupta | ............. | G01M 11/332 356/73.1 |
| 2012/0224808 A1* | 9/2012 | Hayashi | ............... | G01M 11/088 385/31 |

(Continued)

OTHER PUBLICATIONS

Amy Van Newkirk et al., "Multicore Fiber Sensors for Simultaneous Measurement of Force and Temperature", IEEE Photonics Technology Letters, vol. 27, No. 14, Jul. 15, 2015, pp. 1523-1526.

(Continued)

*Primary Examiner* — Shawn Decenzo
(74) *Attorney, Agent, or Firm* — Drinker Biddle & Reath LLP

(57) ABSTRACT

An optical characteristic of a coupled multi-core optical fiber is evaluated without core alignment, one of plural cores thereof being arranged as a center core at the center of a cladding thereof, a total number of spatial modes being a number of the cores or greater, (a fiber length)×(a power coupling coefficient between the cores) being 10 or greater. The coupled multi-core optical fiber is joined to a dummy fiber, having a core at the center of a cladding having the same shape and dimension as those of the coupled multi-core optical fiber, by causing one ends of the fibers to face each other and aligning the fibers with reference to the circumferences of the fibers. Light is launched to the coupled multi-core optical fiber joined to the dummy fiber, and a light measurement unit measures the light passing through the fibers.

13 Claims, 10 Drawing Sheets

(56) References Cited

U.S. PATENT DOCUMENTS

2014/0003807 A1      1/2014  Hamaguchi et al.
2014/0125971 A1*     5/2014  Jiang ..................... G01M 11/33
                                                        356/73.1
2018/0172920 A1*     6/2018  Froggatt ............. G02B 6/3843

OTHER PUBLICATIONS

Roland Ryf et al., "Coherent 1200-km 6×6 MIMO Mode-Multiplexed Transmission over 3-core Microstructured Fiber," ECOC Postdeadline Papers Th.13.C.1, 2011, pp. 1-3.

Taiji Sakamoto et al., "Fiber Twisting- and Bending-Induced Adiabatic/Nonadiabatic Super-mode Transition in Coupled Multicore Fiber," Journal of Lightwave Technology, 2016, pp. 1228-1237, vol. 34, No. 4.

D. Marcuse, "Theory of Dielectric Optical Waveguides", AT&T Bell Laboratories, Academic Press, Inc., 1991 (partial).

T. Hayashi, "Multi-core Fibers for Space Division Multiplexing", Handbook of Optical Fibers, G.-D. Peng, Ed. Springer, Singapore, 2018 (full).

* cited by examiner

OPTICAL FIBER EVALUATION METHOD AND OPTICAL FIBER EVALUATION DEVICE

TECHNICAL FIELD

The present invention relates to an optical fiber evaluation method and an optical fiber evaluation device.

BACKGROUND ART

Various methods for evaluating performance of an optical fiber have been discussed. For example, coupled multi-core optical fibers have been evaluated in Roland Ryf, et al. "Coherent 1200-km 6×6 MIMO Mode-Multiplexed Transmission over 3-Core Microstructured Fiber," ECOC Post-deadline papers Th.13.C.1 (2011) and Taiji Sakamoto et al. "Fiber Twisting- and Bending-Induced Adiabatic/Nonadiabatic Super-Mode Transition in Coupled Multicore Fiber," J. Lightw. Technol., 34(4), 1228-1237 (2016).

SUMMARY OF INVENTION

Technical Problem

The present invention provides an optical fiber evaluation method and an optical fiber evaluation device that each can evaluate performance of a coupled multi-core optical fiber without core alignment.

Solution to Problem

An optical fiber evaluation method according to a first aspect of the present invention evaluates an optical characteristic of a coupled multi-core optical fiber (hereinafter, referred to as coupled MCF) including a plurality of cores and a common cladding, one of the plurality of cores being arranged as a center core at the center of the cladding, a total number of spatial modes being a number of the plurality of cores or greater, (a fiber length)×(a power coupling coefficient between the cores)

being 10 or greater. The evaluation method includes arranging a first dummy fiber such that one end of the first dummy fiber faces one end of the coupled MCF, the first dummy fiber including a cladding having a shape and a dimension being the same as a shape and a dimension of the cladding of the coupled MCF, and a core at the center of the cladding; aligning the coupled MCF and the first dummy fiber with each other with reference to a circumference of the cladding of the coupled MCF and a circumference of the cladding of the first dummy fiber, joining the coupled MCF and the first dummy fiber to each other while the center core of the coupled MCF faces the core of the first dummy fiber, and launching light from a light source to the coupled MCF joined to the first dummy fiber, and measuring light passing through the first dummy fiber and the coupled MCF with a light measurement unit. In this case, "dummy fiber" represents a fiber that launches light to a test fiber or a fiber that receives light from the test fiber.

In the optical fiber evaluation method according to the aspect of the present invention, the alignment between the coupled MCF and the first dummy fiber may be performed by mating an end surface of the coupled MCF and an end surface of the first dummy fiber with each other while the coupled MCF and the first dummy fiber are arranged in a V-groove.

Also, in the optical fiber evaluation method according to the aspect of the present invention, the first dummy fiber may be a single-mode fiber, and the method may include joining one end of a second dummy fiber to another end of the coupled MCF, the second dummy fiber being another single-mode fiber including a cladding having a shape and a dimension being the same as the shape and the dimension of the cladding of the coupled MCF, and a core at the center of the cladding; measuring a transmission spectrum of the center core in the coupled MCF by inputting the light from the light source to the coupled MCF through the first dummy fiber and measuring light from the coupled MCF through the second dummy fiber with the light measurement unit; and evaluating mode dispersion of the coupled MCF by analyzing the transmission spectrum.

In this case, the light that may be input to the coupled MCF joined to the first and second dummy fibers may be a single polarized wave, and the method may include measuring, with the light measurement unit, a transmission spectrum of a single polarized wave of the center core in the coupled MCF by causing the light from the coupled MCF joined to the second dummy fibers to pass through a polarizing filter or a polarizing splitter.

Further, in the optical fiber evaluation method according to the aspect of the present invention, the first dummy fiber may be a single-mode fiber and the one end of the coupled MCF may be an end to which the light from the light source is input, and the method may include joining one end of a second dummy fiber to another end of the coupled MCF, the second dummy fiber being a multimode fiber including a cladding having a shape and a dimension being the same as a shape and a dimension of the cladding of the coupled MCF, and a core at the center of the cladding, the core having a greater radius than a maximum value of a distance between a circumference of a core provided at an outermost side and the center of the cladding in the coupled MCF; and evaluating loss of the coupled MCF by inputting the light from the light source to the coupled MCF through the first dummy fiber and measuring light from the coupled MCF through the second dummy fiber with the light measurement unit.

Alternatively, in the optical fiber evaluation method according to the aspect of the present invention, the method may include evaluating chromatic dispersion of the coupled MCF by inputting light with a wavelength swept or light modulated with a predetermined frequency to the coupled MCF joined to the first dummy fiber, measuring light from the coupled MCF with the light measurement unit, and measuring wavelength dependence of a group delay in the coupled MCF.

Still alternatively, in the optical fiber evaluation method according to the aspect of the present invention, the first dummy fiber may be a single-mode fiber, another end of the coupled MCF may be an open end, and the method may include evaluating backscattering of the coupled MCF by inputting the light from the light source to the coupled MCF joined to the first dummy fiber through the first dummy fiber and measuring light from the coupled MCF with the light measurement unit through the first dummy fiber.

According to a second aspect of the present invention, there is provided an optical fiber evaluation device that evaluates an optical characteristic of a coupled MCF including a plurality of cores and a common cladding, one of the plurality of cores being arranged as a center core at the center of the cladding, a total number of spatial modes being a number of the plurality of cores or greater, (a fiber length)×(a power coupling coefficient between the cores)

being 10 or greater. The evaluation device includes a light source; a dummy fiber including a cladding having a shape and a dimension being the same as a shape and a dimension of the cladding of the coupled MCF, and a core at the center of the cladding; and a light measurement unit. The dummy fiber is arranged such that one end of the dummy fiber faces one end of the coupled MCF, the coupled MCF and the dummy fiber are aligned with each other with reference to a circumference of the cladding of the coupled MCF and a circumference of the cladding of the dummy fiber, and the coupled MCF and the dummy fiber are joined to each other while the center core of the coupled MCF faces the core of the dummy fiber. Light emitted from the light source is input to the coupled MCF joined to the dummy fiber, and light passing through the dummy fiber and the coupled MCF is measured with the light measurement unit.

Advantageous Effects of Invention

With the aspects of the present invention, the performance of the coupled multi-core optical fiber can be evaluated without core alignment.

DESCRIPTION OF EMBODIMENTS

Figure 1:
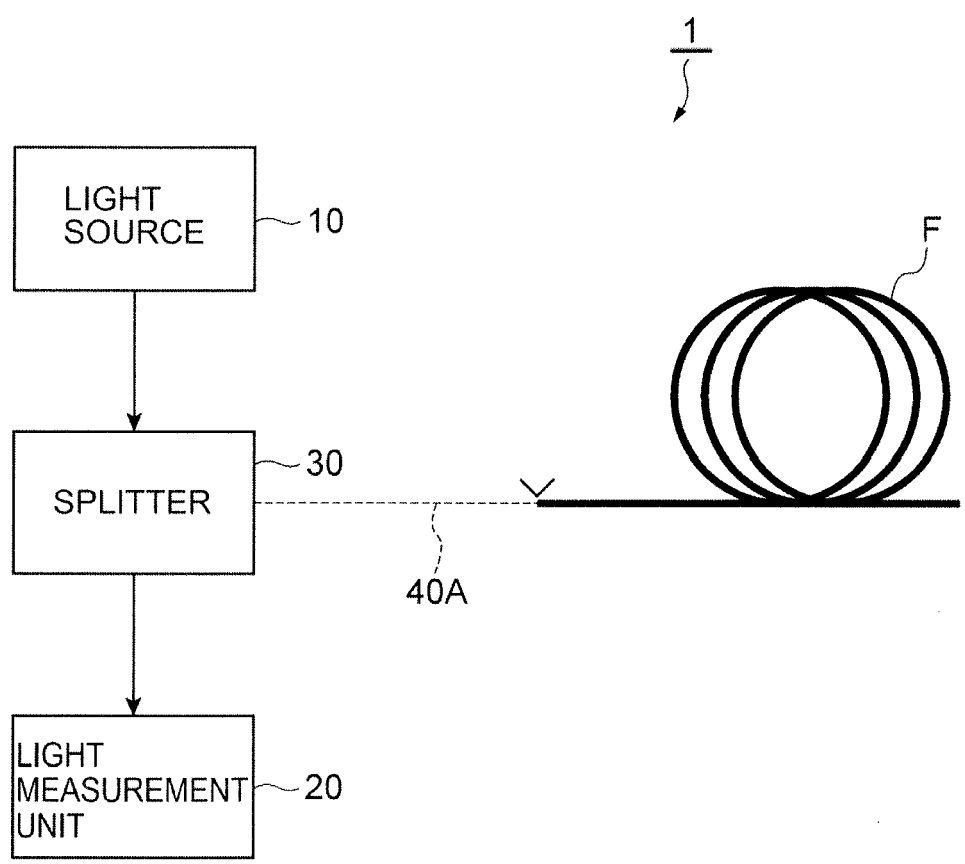
FIG. 1 is a conceptual diagram of a device that evaluates backscattering of an optical fiber.

Specific examples of an optical fiber evaluation method and an optical fiber evaluation device according to the invention are described below with reference to the drawings. However, the present invention is not limited to these examples and is defined by the claims. It is intended that the invention includes meaning equivalent to the scope of the claims and all modifications within the scope.

To evaluate performance of a coupled multi-core optical fiber (coupled MCF) that is used as an integrated waveguide in which a plurality of cores are "coupled," the positions of cores have to be aligned with each other between a coupled MCF to be measured and an optical fiber (in this specification, referred to as dummy fiber) for inputting and outputting light to the coupled MCF. However, visually recognizing and positioning the cores (core alignment) requires precise positioning. Hence, an improvement has been desired in view of working efficiency.

An optical fiber to be evaluated is a coupled MCF including a plurality of cores and a common cladding, one of the plurality of cores being arranged as a center core at the center of the cladding, the total number of spatial modes being the number of the plurality of cores or greater, (a fiber length)×(a power coupling coefficient between the cores)

being 10 or greater. In the following embodiment, the above-described coupled MCF may be referred to as "optical fiber to be evaluated" or "optical fiber F."

In a fiber evaluation method according to an embodiment of the invention, one end of a single-core dummy fiber is arranged to face one end of a coupled MCF to be evaluated, the single-core dummy fiber including a cladding having the same shape and the same dimension as the shape and the dimension of a cladding of the coupled MCF, and a core at the center of the cladding. The coupled MCF and the single-core dummy fiber are aligned with each other with reference to the circumference of the cladding of the coupled MCF and the circumference of the cladding of the single-core dummy fiber, so that the center core of the coupled MCF faces the core of the single-core dummy fiber. Then, light from a light source is introduced to the coupled MCF or light from the coupled MCF is received by a light measurement unit through the single-core dummy fiber. With this configuration, the characteristics of the above-described coupled MCF can be evaluated only by outer-diameter alignment (cladding alignment).

In the optical fiber evaluation method having the above-described configuration, a plurality of parameters relating to the characteristics of the coupled MCF can be evaluated. To be specific, transmission loss, bending loss, mode dispersion, and chromatic dispersion of the coupled MCF are parameters to be evaluated. The peripheral device configuration and the specific evaluation method vary in accordance with the parameter to be evaluated, and therefore the device configuration and the evaluation method for each of the above-described parameters are described. When the device configurations include a common part, description on the common part is omitted.

1. Loss Evaluation Method

Loss evaluation methods may be two types of transmission loss evaluation methods including a backscattering evaluation method and a cutback evaluation method, and one type of a bending loss evaluation method.

1-1. Backscattering Evaluation Method

FIG. 1 is a conceptual diagram of an evaluation device 1 used for evaluating transmission loss of an optical fiber. The evaluation device 1 includes a light source 10, a light measurement unit 20, a splitter 30 that is provided between the light source 10 and the light measurement unit 20 and splits light emitted from the light source 10, and a single-core dummy fiber 40A that launches light split by the splitter 30 to an optical fiber F to be evaluated, and receives light from the optical fiber F to be evaluated and outputs the light to the light measurement unit 20 through the splitter 30.

The light source 10 is not particularly limited. For example, a halogen lamp or a wavelength tunable laser may be used. When the transmission loss is evaluated, the light source 10 is requested to have a function of emitting pulsed light. For the light measurement unit 20, for example, an optical power meter or an optical spectrum analyzer (OSA) may be used.

The single-core dummy fiber 40A is an optical fiber including a cladding having the same shape and the same dimension as the shape and the dimension of the cladding of the optical fiber F to be evaluated, and a core at the center of the cladding. The single-core dummy fiber 40A is aligned with the optical fiber F to be evaluated by outer-diameter alignment with reference to the circumference of the cladding of the optical fiber F and the circumference of the cladding of the single-core dummy fiber 40A. The outer-diameter alignment may be performed, for example, by using a known alignment member having a V-groove formed in a flat plate. By using the alignment member having the V-groove, the single-core dummy fiber can be easily aligned with the coupled MCF. The single-core dummy fiber 40A used in FIG. 1 is a single-mode optical fiber. Also, the diameter of the single-core dummy fiber 40A can be determined in accordance with the optical fiber F to be evaluated. For example, the outer diameter of the single-core dummy fiber 40A may be 125 µm or may be an outer diameter in a range from 124 µm to 126 µm.

Figure 2:
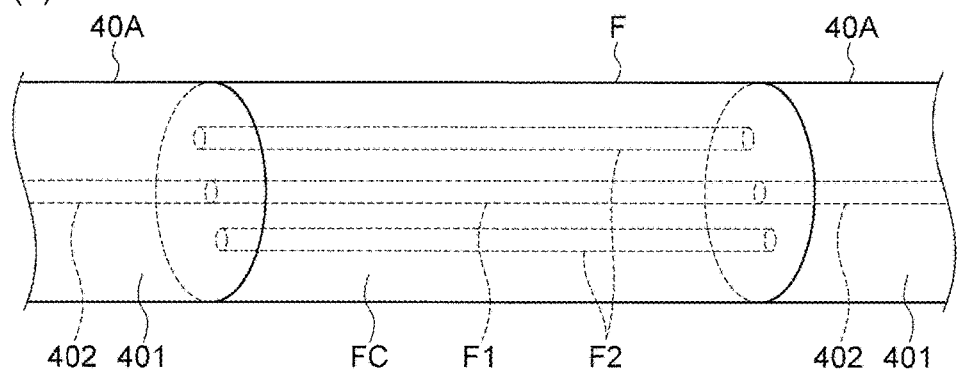
FIG. 2 provides conceptual diagrams each showing a preferable joint example between an optical fiber to be evaluated and a single-core dummy fiber.
Figure 2:
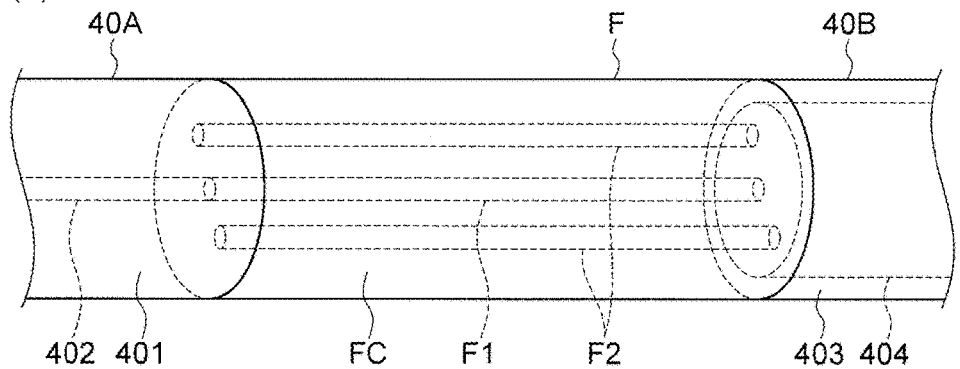
Figure 2:
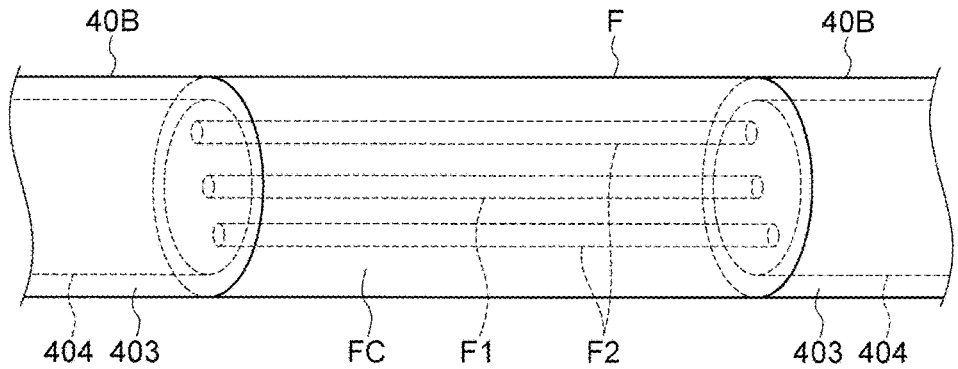
Figure 3:
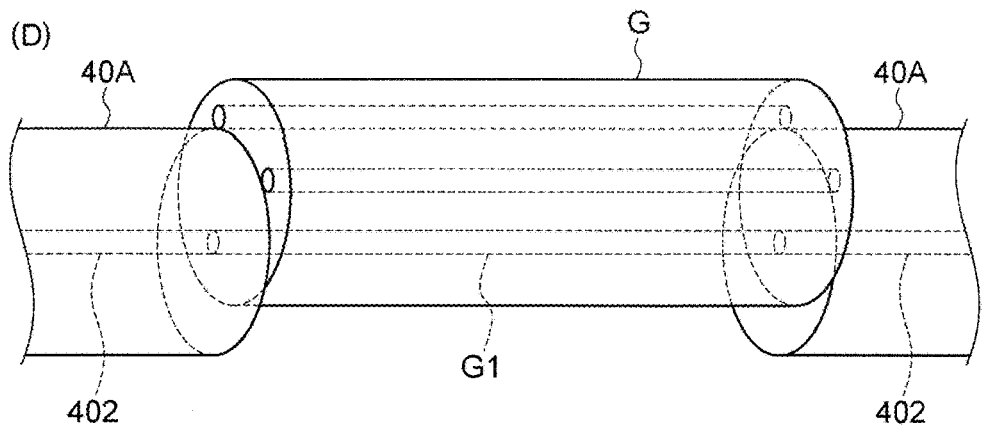
FIG. 3 provides conceptual diagrams each showing an inappropriate joint example between an optical fiber to be evaluated and a single-core dummy fiber.
Figure 3:
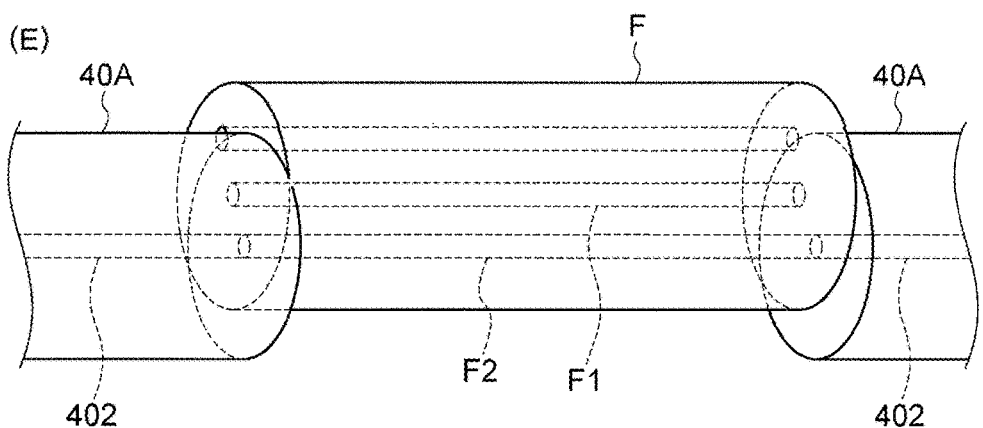
Figure 3:
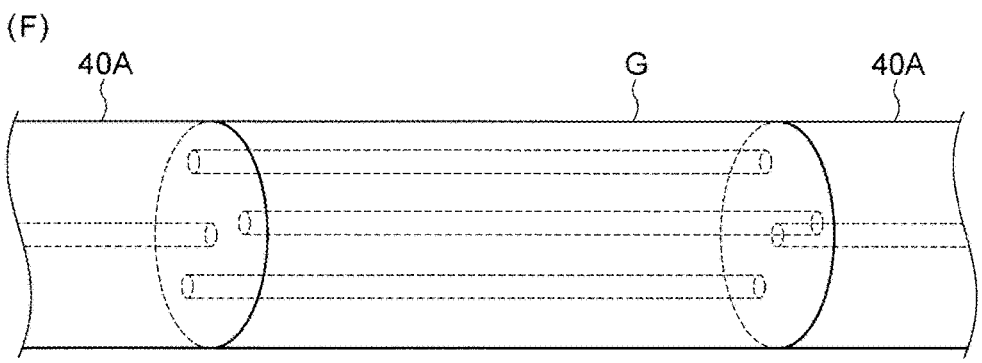

FIG. 2 provides conceptual diagrams showing preferable joint examples (A), (B), and (C) between optical fibers F to be evaluated and single-core dummy fibers. FIG. 3 provides conceptual diagrams showing inappropriate joint examples (D), (E), and (F) between optical fibers to be evaluated and single-core dummy fibers. While the single-core dummy fiber 40A is joined to one end of the optical fiber F in the evaluation device 1, single-core dummy fibers may be joined to both ends of an optical fiber F in another evaluation device (described later). Hence, with reference to FIG. 2 and FIG. 3, a case where single-core dummy fibers are joined to both ends of an optical fiber F is described.

In the joint example (A), single-mode single-core dummy fibers 40A are joined to both ends of an optical fiber F by outer-diameter alignment. In this case, a center core F1 provided at the center of a cladding FC of the optical fiber F faces cores 402 provided at the center of claddings 401 of the single-core dummy fibers 40A. Also, cores F2 provided at positions other than the center of the cladding FC of the optical fiber F face the claddings 401 of the single-core dummy fibers 40A.

The joint example (B) shows an example in which a single-mode single-core dummy fiber 40A is joined to one end of an optical fiber F by outer-diameter alignment and a multimode single-core dummy fiber 40B is joined to another end of the optical fiber F by outer-diameter alignment. The multimode single-core dummy fiber 40B is used for another evaluation method (described later). In this case, the relationship between the optical fiber F and the single-core dummy fiber 40A is the same as the joint example (A). Also, a center core F1 provided at the center and cores F2 provided at positions other than the center of a cladding FC of the optical fiber F face a core 404 provided at the center of a cladding 403 of the single-core dummy fiber 40B. That is, the core radius of the multimode fiber is greater than the maximum value of the distance between the circumference of the core provided at the outermost side and the center of the cladding in the optical fiber F.

In the joint example (C), multimode single-core dummy fibers 40B are joined to both ends of an optical fiber F by outer-diameter alignment. Also in this case, similarly to the joint example (B), cores F1 and F2 of the optical fiber F face cores 404 of the single-core dummy fibers 40B.

The joint example (D) shows an example in which a core G1 included in an optical fiber G to be evaluated faces cores 402 of single-core dummy fibers 40A. In the joint example (D), the optical fiber G does not include a core at the center of a cladding thereof, and core alignment is performed instead of outer-diameter alignment.

The joint example (E) shows an example in which an optical fiber F having a core F1 at the center faces single-core dummy fibers 40A; however, a core F2 at a position other than the center faces cores 402. Also in this case, core alignment is performed instead of outer-diameter alignment. As shown in the joint example (D) and the joint example (E), an optical fiber to be evaluated can be joined to a single-core dummy fiber 40A by core alignment. However, the time required for the alignment work increases, resulting in a large increase in inspection cost for the optical fiber.

The joint example (F) shows an example in which an optical fiber G not including a core at the center of a cladding thereof is joined to single-core dummy fibers 40A by outer-diameter alignment. In this case, cores are not joined to each other, and hence the optical fiber G cannot be evaluated.

The examples shown in FIG. 3 each are an inappropriate example for joint to a single-core dummy fiber when an optical fiber is evaluated by using the evaluation device according to this embodiment. Hence, as shown in FIG. 2, a coupled MCF including a core F1 at the center of a cladding FC is selected as an optical fiber F to be evaluated so that cores can be joined to each other by outer-diameter alignment.

Referring back to FIG. 1, an evaluation method for transmission loss of the optical fiber F by using the evaluation device 1 is described. In the evaluation device 1, the optical fiber F is joined to the single-core dummy fiber 40A by outer-diameter alignment and then the light source 10 emits pulsed light. The pulsed light from the light source 10 is launched to the single-core dummy fiber 40A through the splitter 30, passes through the single-core dummy fiber 40A, and is launched to the core F1 at the center of the optical fiber F. The light from the light source 10 is distributed from the center core F1 to the other peripheral cores F2 while propagating by a small distance (about several tends of meters or smaller) in the optical fiber F. Consequently, the light propagates through the cores F1 and F2 in a state in which the power of the light reaches a balanced state.

Also, the pulsed light propagating through the optical fiber F scatters backward at each position along the longitudinal direction of the optical fiber F. This backscattering light is received by the single-core dummy fiber 40A. This backscattering light passes through the splitter 30 and reaches the light measurement unit 20. The light measurement unit 20 measures a change over time in the power of the backscattering light. The difference in the position at which the backscattering occurs in the optical fiber F appears as the difference in the time at which the backscattering light is observed (with reference to pulse oscillation). The transmission loss average value of all modes in the optical fiber F is evaluated on the basis of the state of attenuation of light in a part extending to a downstream side from the position at which the light from the light source 10 is distributed to all cores (F1, F2) and reaches the balanced state as described above, t.

Figure 4:
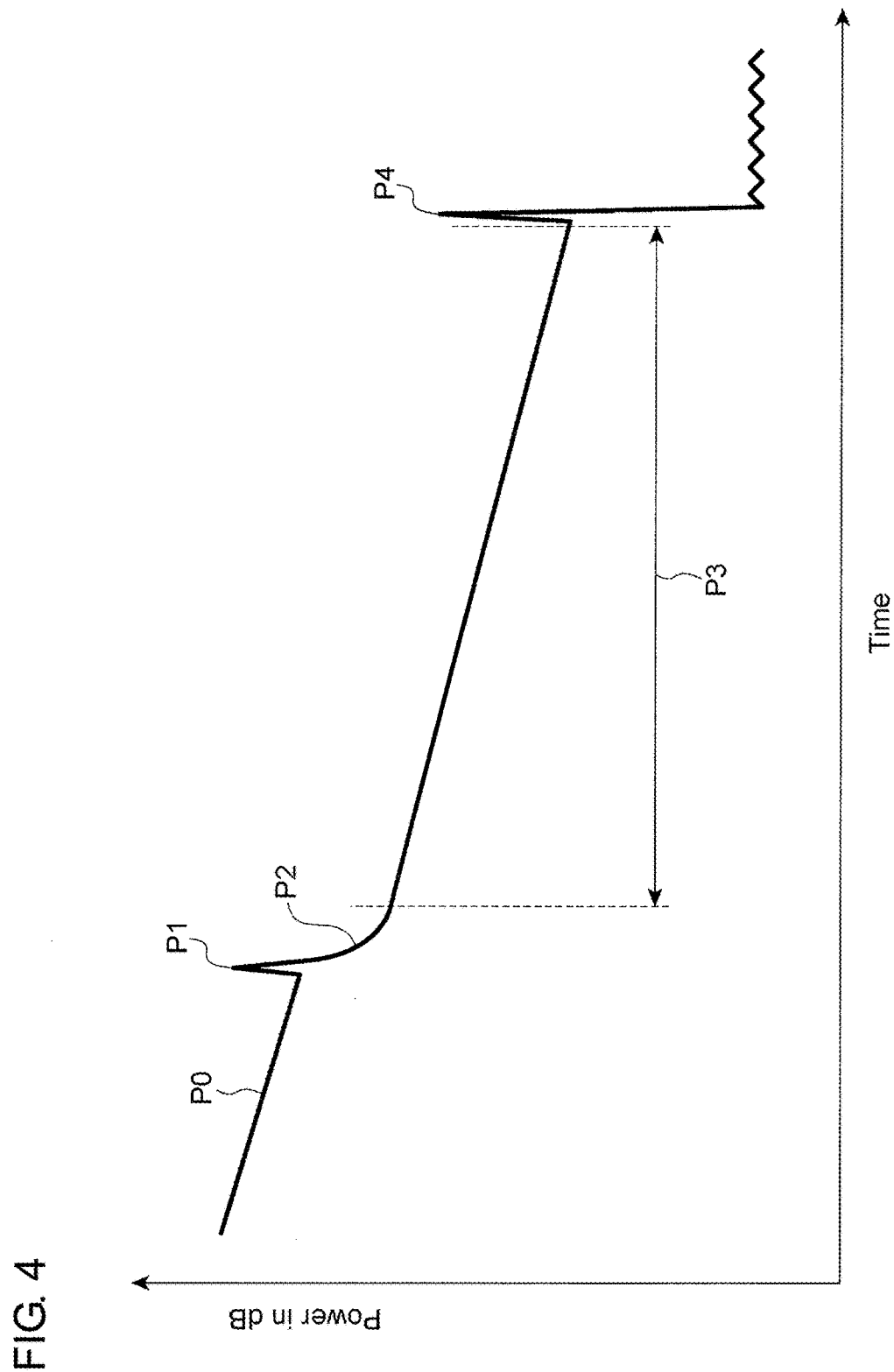
FIG. 4 is a graph explaining an evaluation method for backscattering.

FIG. 4 is a graph explaining an evaluation method for backscattering. The horizontal axis plots the time and the vertical axis plots the power of light that is detected by the light measurement unit 20. The light measurement unit 20 first detects light transmitted through the single-core dummy fiber 40A with reference to oscillation of single pulsed light from the light source 10 (P0). Then, the light measurement unit 20 detects a peak of reflected light at the joint when the pulsed light reaches the joint between the single-core dummy fiber 40A and the optical fiber F (P1), power coupling by distribution of the light launched to the optical fiber F from the center core F1 to the core F2 (P2), a change in backscattering of the light advancing in the optical fiber F after the distribution (P3), and a peak of the reflected light at the open end of the optical fiber F (P4) in that order. The transmission loss of the optical fiber F can be evaluated by measuring a change in backscattering of the light advancing in the optical fiber F (P3) after the distribution.

1-2. Cutback Evaluation Method

Figure 5:
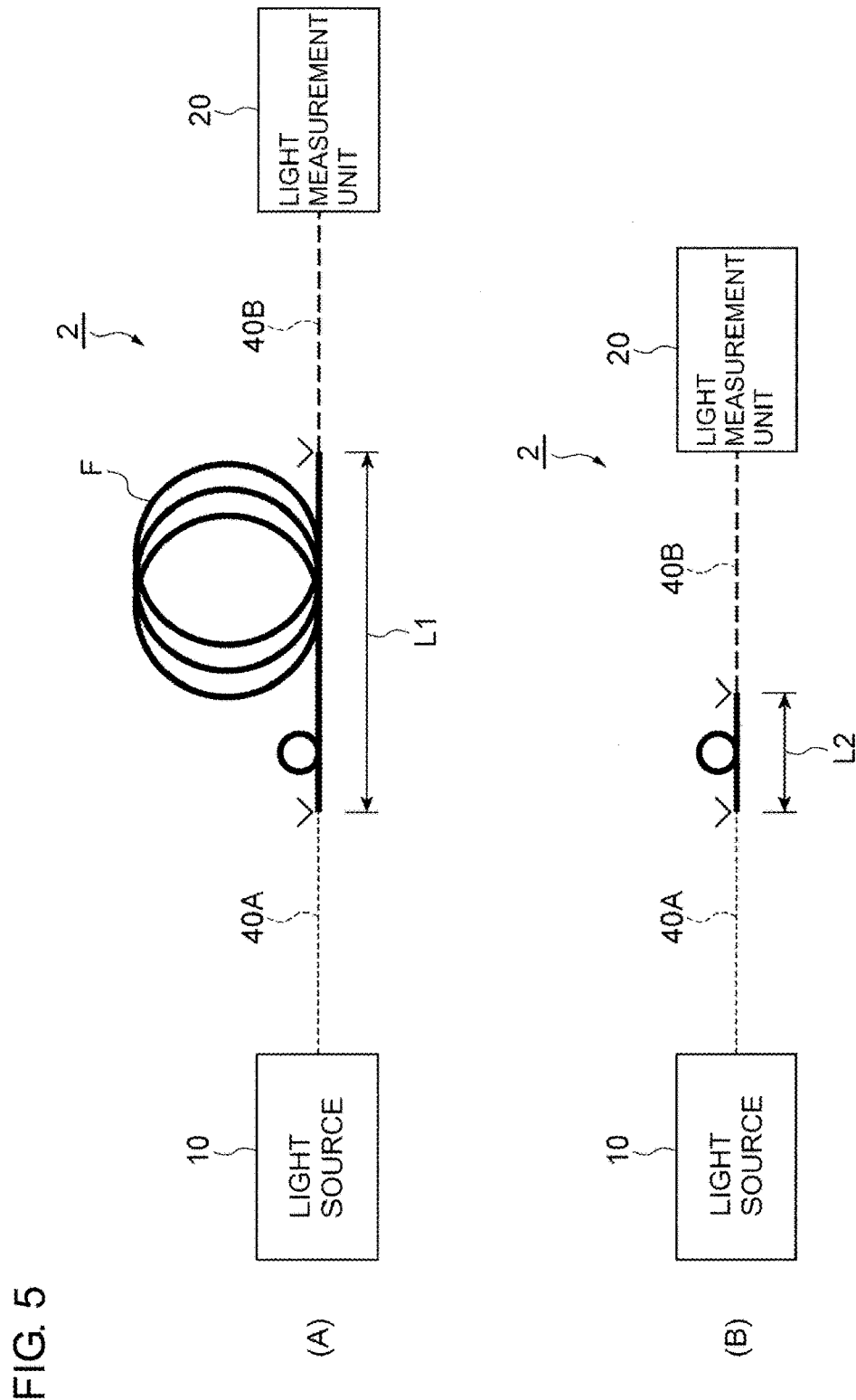
FIG. 5 provides conceptual diagrams each explaining a device and a method that evaluate loss of an optical fiber by a cutback method.

FIG. 5 provides conceptual diagrams each explaining a device 2 and a method that evaluate loss of an optical fiber F by a cutback method. Part (A) shows a joint state before cutback and part (B) shows a joint state after cutback. The evaluation device 2 includes a light source 10, a light measurement unit 20, a single-core dummy fiber 40A that launches light from the light source 10 to an optical fiber F to be evaluated, and a single-core dummy fiber 40B that receives the light from the optical fiber F and outputs the light to the light measurement unit 20. The single-core dummy fiber 40A is a single-mode fiber. The single-core dummy fiber 40A preferably has a mode field diameter matching with the mode field diameter of a center core F1 in the optical fiber F to be evaluated. Also, the single-core dummy fiber 40B is a multimode fiber, and can receive light of all propagation modes of the optical fiber F. The single-core dummy fibers 40A and 40B are joined to the optical fiber F by outer-diameter alignment.

The light source 10 is not particularly limited. For example, a broadband light source such as a halogen lamp or a wavelength tunable laser may be used. Also, a wavelength tunable transmission filter and a broadband light source may be combined and serve as a wavelength tunable light source. If the wavelength tunable light source is employed as the light source 10, an optical power meter may be used for the light measurement unit 20. Also, if the broadband light source is employed as the light source 10, an optical spectrum analyzer (OSA) may be used for the light measurement unit 20.

As shown in part (A), measurement light is output from the light source 10, and is launched to the optical fiber F through the single-core dummy fiber 40A on the input side. Then, wavelength dependence of the power of light reaching the light measurement unit 20 from the optical fiber F through the single-core dummy fiber 40B on the light receiving side is measured. It is assumed that the length of the optical fiber F in this case is L1. Then, as shown in part (B), the optical fiber F is cut such that a part on the input end side having a length L2 remains. Then, an end on the output side of the optical fiber F having the length L2 is joined to the single-core dummy fiber 40B for receiving light, by outer-diameter alignment. Then, the measurement light is output from the light source 10, and wavelength dependence of the power of light reaching the light measurement unit 20 through the optical fiber F having the length L2 is measured. Wavelength dependence of the all-mode average value of the transmission loss of the optical fiber F for the length (L1-L2) can be obtained by using the difference in wavelength dependence between the two optical powers relating to the optical fiber F.

When a power coupling coefficient between cores is h, $hL2$ is preferably equal to or greater than 1, and $hL2$ is more preferably equal to or greater than 10. By performing evaluation on the basis of such a relationship, the characteristic of the optical fiber F can be further precisely evaluated.

1-3. Bending Loss Evaluation Method

Figure 6:
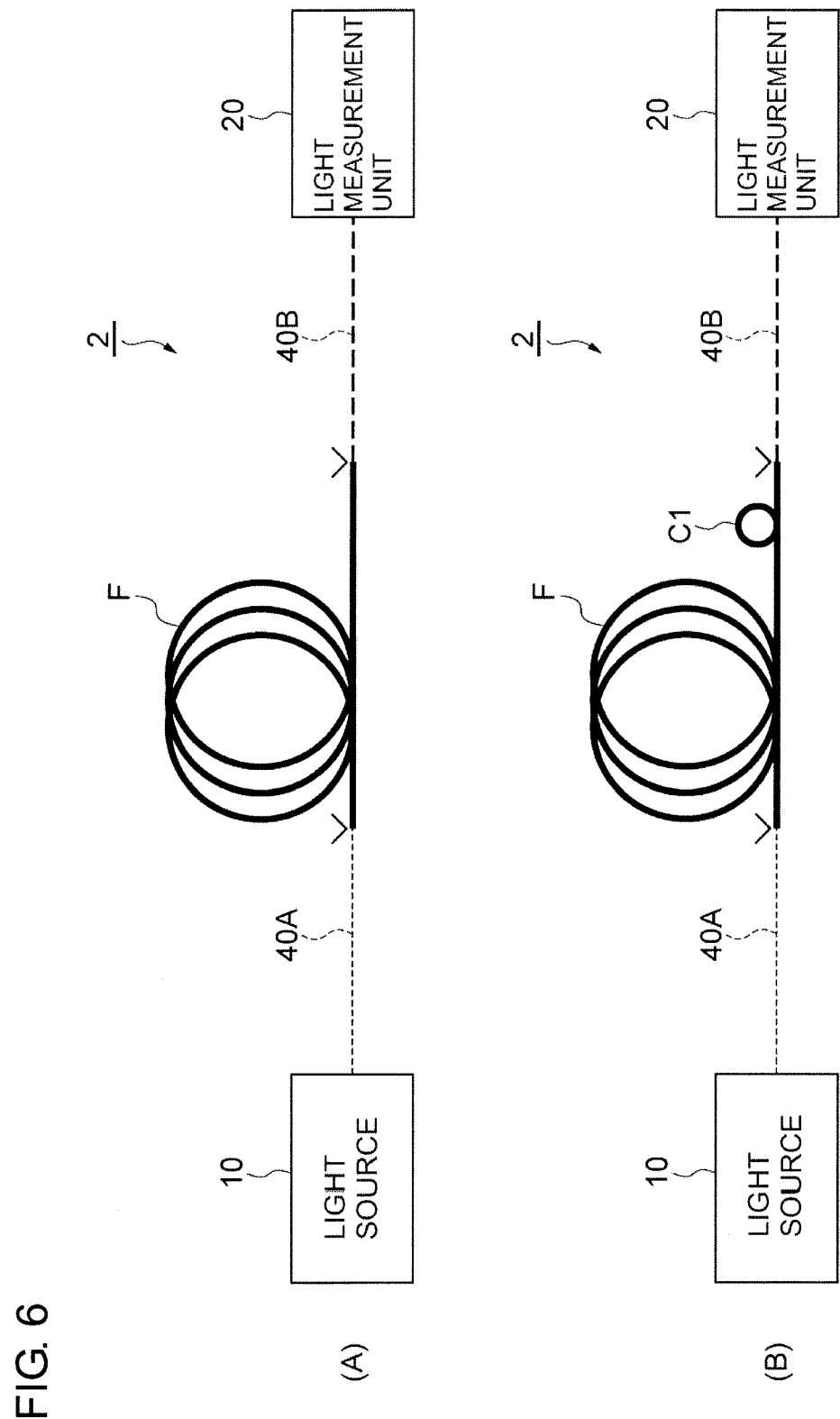
FIG. 6 provides conceptual diagrams each explaining a device and a method that evaluate bending loss of an optical fiber.

FIG. 6 provides conceptual diagrams explaining the device 2 and the method that evaluate bending loss of an optical fiber F. Part (A) shows a state before a bending to be evaluated is applied. Part (B) shows a state after a bending to be evaluated is applied. The evaluation for bending loss can use the same device configuration as the device configuration of the evaluation for the loss by the cutback method. Further, a light-emitting diode or a superluminescent diode being a light source with a fixed wavelength having a line width of 50 nm or smaller may be employed as the light source 10, and an optical power meter may be employed as the light measurement unit 20.

First, as shown in part (A), the optical fiber F is provided in a predetermined bending state, measurement light is output from the light source 10, and the measurement light is launched to the optical fiber F through the single-core dummy fiber 40A on the input side. Then, the power (and the wavelength dependence of the optical power) of light reaching the light measurement unit 20 from the optical fiber F through the single-core dummy fiber 40B on the light receiving side is measured.

Then, let z be a position in the longitudinal direction from the launch end (an end on the side joined to the single-core dummy fiber 40A) of the optical fiber F, a bending C1 to be evaluated (see part (B)) is applied at z equal to or greater than $1/h$. Then, in this state, measurement light is output from the light source 10, and is launched to the optical fiber F through the single-core dummy fiber 40A on the input side. Then, the power (and the wavelength dependence of the optical power) of light reaching the light measurement unit 20 from the optical fiber F through the single-core dummy fiber 40B on the light receiving side is measured.

Accordingly, the difference in (the wavelength dependence of) the optical power in accordance with the presence of the bending C1 to be measured can be calculated, and hence the all-mode average value of bending loss of the optical fiber F with respect to the bending C1 to be measured can be evaluated. When the position z at which the bending C1 is provided is equal to or greater than $10/h$, the characteristic of the optical fiber F can be further precisely evaluated.

2. Mode Dispersion Evaluation Method

Figure 7:
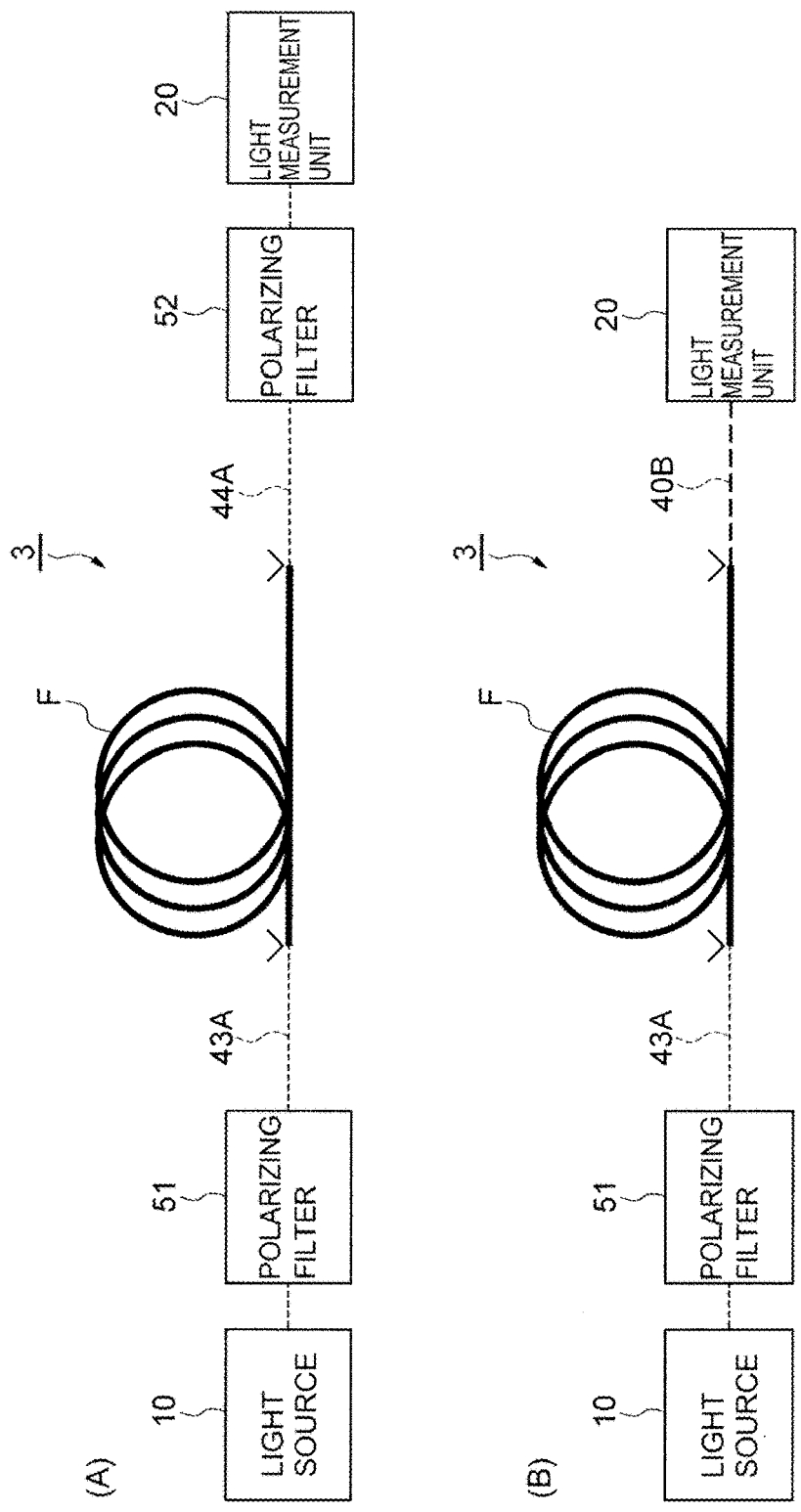
FIG. 7 provides conceptual diagrams each explaining a device and a method that evaluate mode dispersion of an optical fiber.

FIG. 7 provides conceptual diagrams explaining a device 3 and a method that are used for evaluating mode dispersion of an optical fiber F. Part (A) shows a step of measuring a transmission spectrum of the center core. Part (B) shows a step of measuring transmission spectra of all modes. For the evaluation method for mode dispersion, a fixed analyzer method is used. The evaluation device 3 includes a light source 10, a light measurement unit 20, a single-core dummy fiber 43A that launches light from the light source 10 to an optical fiber F to be evaluated, and single-core dummy fibers 44A and 40B that each receive light from the optical fiber F and output the light to the light measurement unit 20.

The single-core dummy fibers 43A and 44A are single-mode fibers. Each of the single-core dummy fibers 43A and 44B preferably has a mode field diameter matching with a mode field diameter of a center core F1 in the optical fiber F to be evaluated. Also, the single-core dummy fiber 40B can receive light in all propagation modes of the optical fiber F. The single-core dummy fibers 40B, 43A, and 44A each are joined to the optical fiber F by outer-diameter alignment.

Also, a polarizing filter 51 is provided between the light source 10 and the single-core dummy fiber 43A, and a polarizing filter 52 is provided between the single-code dummy fiber 44A and the light measurement unit 20. Instead of providing the polarizing filter 51, a light source that outputs light being a single polarized wave may be provided. The polarizing filters 51 and 52 may be omitted; however, the polarizing filters 51 and 52 may increase precision.

Regarding the combination of the light source 10 and the light measurement unit 20, for example, the light source 10 may be a wavelength tunable light source such as a wavelength tunable laser, and the light measurement unit 20 may be an optical power meter. In this case, the oscillation frequency of laser light emitted from the wavelength tunable laser may be preferably 1 MHz or lower, and more preferably 100 kHz or lower. Also, the step width with which the wavelength of the laser light is changed may be preferably 10 pm or smaller, more preferably 5 pm or smaller, and further preferably 1 pm or smaller. By decreasing the step width as described above, large mode dispersion can be measured.

Another combination of the light source 10 and the light measurement unit 20 may be a configuration in which a broadband light source is used for the light source 10 and an optical spectrum analyzer (OSA) is used for the light measurement unit 20. In this case, the wavelength resolution of OSA may be preferably 10 pm or lower, more preferably 5 pm or lower, and further preferably 1 pm or lower.

A method for evaluating a mode dispersion of the optical fiber F using the evaluation device 3 is described. First, as shown in part (A), the optical fiber F is provided in a predetermined bending state, measurement light is output from the light source 10, and the measurement light is launched to the optical fiber F through the single-core dummy fiber 43A on the input side. Then, a spectrum of light reaching the light measurement unit 20 from the optical fiber F through the single-core dummy fiber 44A on the light receiving side is acquired. The spectrum of the light reaching the light measurement unit 20 serves as a transmission spectrum at the center core F1.

Next, the single-core dummy fiber 44A on the light receiving side is changed to the multimode single-core dummy fiber 40B, the polarizing filter 52 is removed, and hence the configuration is changed to the configuration in part (B). Then, in this state, measurement light is output from the light source 10, and is launched to the optical fiber F through the single-core dummy fiber 43A on the input side. Then, a spectrum of light reaching the light measurement unit 20 from the optical fiber F through the single-core dummy fiber 40B on the light receiving side is acquired. The spectrum of the light reaching the light measurement unit 20 serves as a transmission spectrum of all modes by the center core F1 and the peripheral core F2 of the optical fiber F.

The spectrum of the ratio of the optical power of the center core F1 included in the optical power of all modes (center core power ratio spectrum) can be obtained on the basis of the transmission spectrum of all modes and the transmission spectrum of the center core F1 obtained by the above-described two measurements. By analyzing the center core power ratio spectrum, mode dispersion can be evaluated. The specific analysis method in which the mode dispersion is evaluated from the center core power ratio spectrum can be a method disclosed in ITU-T G.650.2 as an evaluation method for mode dispersion between polarization modes of a single-mode fiber.

For an easier evaluation method, mode dispersion can be evaluated by analyzing the transmission spectrum of the center core F1 instead of the center core power ratio spectrum. In this case, measurement using the multimode single-core dummy fiber 40B as shown in part (B) may not be performed.

As shown in part (A) and part (B), if the polarizing filters 51 and 52 are provided or the light source that can output a single polarized wave is used as the light source 10, the transmission spectrum of a single polarized wave can be measured with the light measurement unit 20. Accordingly, mode dispersion can be further correctly evaluated. Even if the polarizing filters 51 and 52 are not provided and a light source different from the light source that outputs a single polarized wave is used as the light source 10, mode dispersion can be evaluated. A polarizing splitter may be used instead of the polarizing filters 51 and 52.

3. Chromatic Dispersion Evaluation Method

Figure 8:
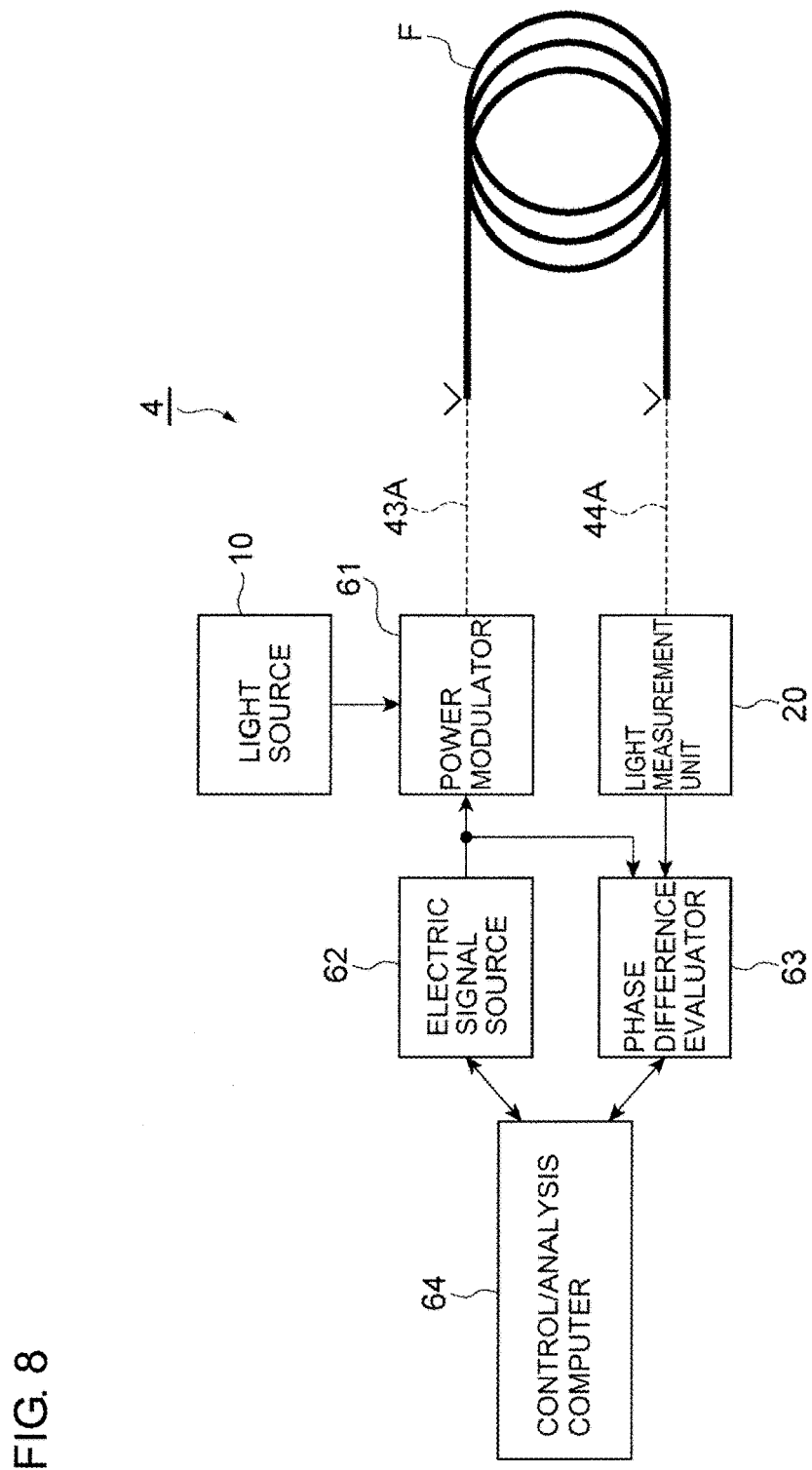
FIG. 8 is a conceptual diagram showing a first configuration of a device that evaluates chromatic dispersion of an optical fiber.

FIG. 8 shows an evaluation device 4 according to a first configuration example of a device that evaluates chromatic dispersion of an optical fiber. The evaluation device 4 includes a light source 10, a light measurement unit 20, a single-mode single-core dummy fibers 43A (input side) and 44A (light receiving side), a power modulator 61, an electric signal source 62, a phase difference evaluator 63, and a control/analysis computer 64.

For the light source 10, for example, a wavelength tunable light source such as a wavelength tunable laser may be used. For the light measurement unit 20, for example, a combination of a photodetector and an oscilloscope may be used. The combination has a function of converting a signal with an optical power detected by the light measurement unit 20 into an electric signal, and measuring a change over time in the electric signal.

The power modulator 61 has a function of modulating the power of light from the light source 10 with a predetermined frequency. The electric signal source 62 has a function of outputting an electric signal relating to the modulation by the power modulator 61. The phase difference evaluator 63 has a function of evaluating a phase difference between an electric signal relating to the modulation from the electric signal source 62 and a power modulation signal of light measured by the light measurement unit 20 and converted into an electric signal. The control/analysis computer 64 has a function of controlling the above-described respective devices, and performing evaluation relating to chromatic dispersion, on the basis of the phase difference detected by the phase difference evaluator 63. To observe the output of the electric signal for modulating the optical power and the electric signal output from the photodetector may use a microwave network analyzer.

In the evaluation device 4, the power of the light output from the light source 10 is modulated with the predetermined frequency by the power modulator 61 on the basis of the electric signal from the electric signal source 62, and then the light is launched to the optical fiber F through the single-core dummy fiber 43A. Then, the light from the optical fiber F passes through the single-core dummy fiber 44A and is launched to the light measurement unit 20. In the light measurement unit 20, as described above, the optical power signal is converted into the electric signal, then the change over time in the electric signal is measured, and the measured result is transmitted to the phase difference evaluator 63.

The phase difference evaluator 63 splits a part of the electric signal for optical power modulation that is transmitted from the electric signal source 62 to the power modulator 61 and acquires the part as a reference signal. Also, the phase difference evaluator 63 acquires a phase difference between the reference signal and the change in power of the electric signal after conversion based on the change in power of light received by the light measurement unit 20. Accordingly, the phase difference evaluator 63 measures the all-mode average value of the group delay caused by propagation of light in the optical fiber F. By repeating this measurement while the wavelength of the light emitted from the light source 10 is changed, the wavelength dependence of the all-mode average value of the group delay relating to the optical fiber F can be measured. By analyzing the wavelength dependence of the all-mode average value of the group delay relating to the optical fiber F with the control/analysis computer 64, the all-mode average value of chromatic dispersion of the optical fiber F can be evaluated.

The analyzation method for chromatic dispersion by using the wavelength dependence of the group delay may be, for example, simple numerical differentiation or may use an approximate formula of numerical differentiation. Also, a group delay spectrum may be approximated by using a polynomial, and the polynomial may be differentiated. Further, a group delay spectrum may be approximated by using Sellmeier's polynomial, and the Sellmeier's polynomial may be differentiated. The details of the analysis method for the chromatic dispersion by using the wavelength dependence of such a group delay are disclosed in ITU-T G.650.1.

Figure 9:
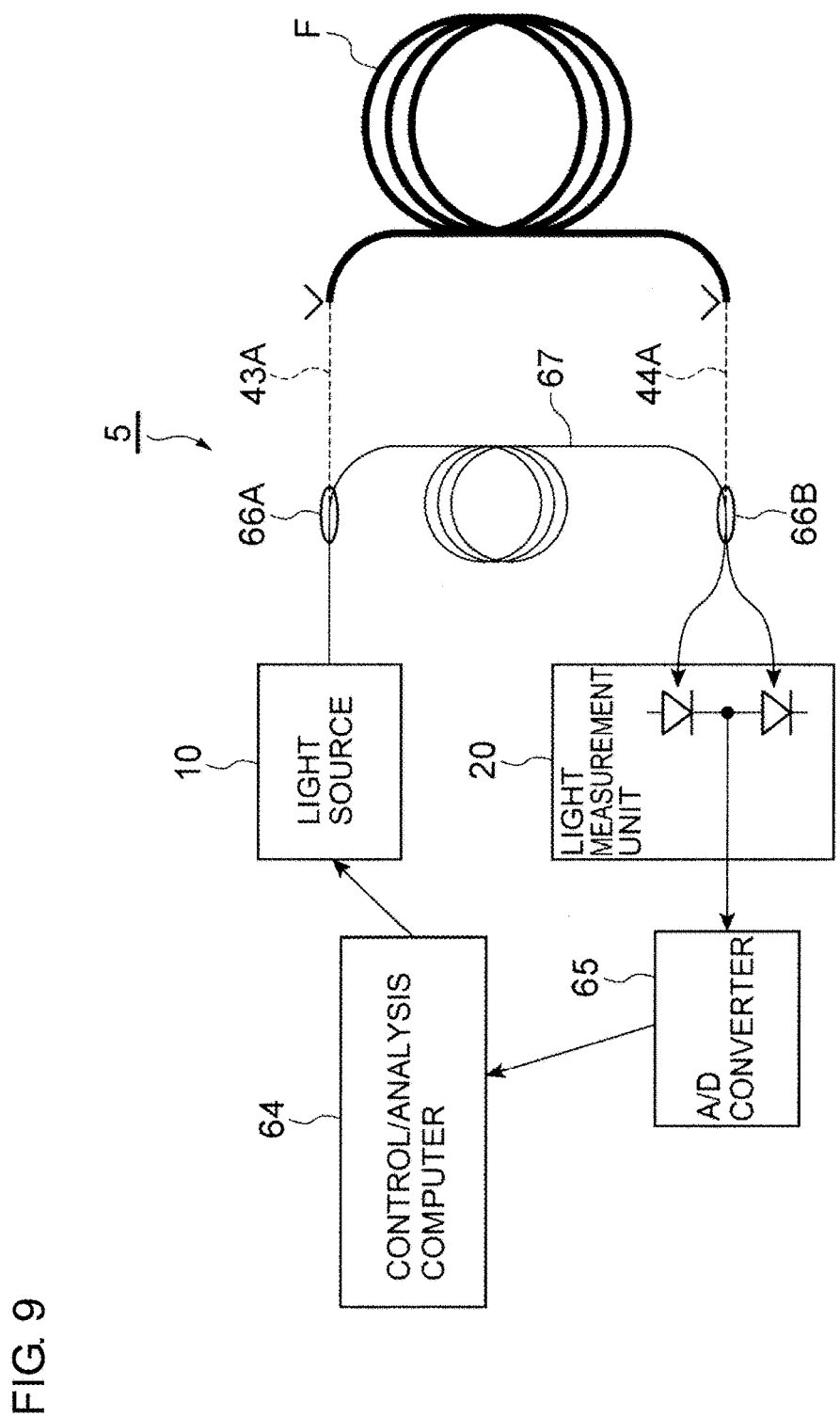
FIG. 9 is a conceptual diagram showing a second configuration of a device that evaluates chromatic dispersion of an optical fiber.

FIG. 9 shows an evaluation device 5 according to a second configuration example of a device that evaluates chromatic dispersion of an optical fiber. The evaluation device 5 includes a light source 10, a light measurement unit 20, single-mode single-core dummy fibers 43A (input side) and 44A (light receiving side), a control/analysis computer 64, an analog-to-digital (A/D) converter 65, optical splitters 66A (input side) and 66B (light receiving side), and a reference optical path 67.

A wavelength swept light source is used for the light source 10. Also, a balanced photodetector is used for the light measurement unit 20. Light from the light source 10 is split by the optical splitter 66A and is output to the single-core dummy fiber 43A and the reference optical path 67. A single-mode optical fiber is used for the reference optical path 67. The light passing through the reference optical path 67 and the light passing through the single-core dummy fiber 43A, the optical fiber F, and the single-core dummy fiber 44A are multiplexed by the optical splitter 66B and then is launched to the light measurement unit 20. The electric signal relating to the optical power detected by the light measurement unit 20 is converted into a digital value by the A/D converter 65 and is transmitted to the control/analysis computer 64.

With the evaluation device 5 shown in FIG. 9, light containing a group delay difference between the light transmitted through the reference optical path 67 and the light transmitted through the optical fiber F is launched to the light measurement unit 20, and hence the light measurement unit 20 can detect the light. The control/analysis computer 64 acquires a beat signal of interference between the above-described two lights by Fourier analysis and hence calculates wavelength dependence of the all-mode average value of the group delay in the optical fiber F on the basis of the wavelength dependence of the group delay difference between the reference optical path 67 and the optical fiber F (the all-mode average value of the optical fiber F) and the wavelength dependence of the previously measured group delay in the reference optical path 67. By analyzing the calculated wavelength dependence, the all-mode average value of the chromatic dispersion of the optical fiber F can be evaluated. The details of the analysis method for the chromatic dispersion by using the wavelength dependence of the group delay in the optical fiber F are disclosed in ITU-T G.650.1.

4. Cut-Off Wavelength Evaluation Method

Figure 10:
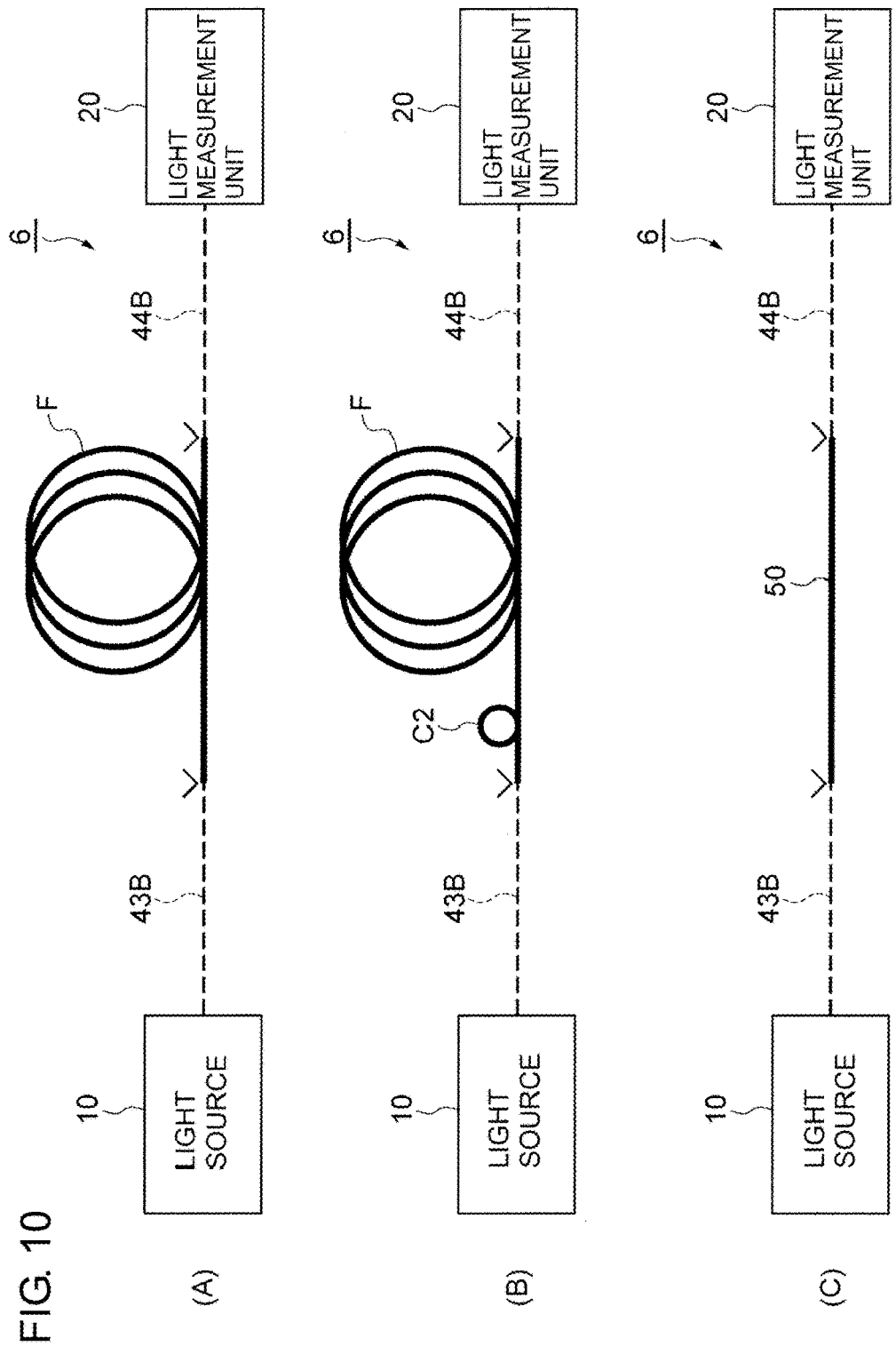
FIG. 10 provides conceptual diagrams each explaining a device and a method that evaluate cut-off wavelength of an optical fiber.

FIG. 10 provides conceptual diagrams each explaining an evaluation device 6 and a method used for evaluating cut-off wavelength of an optical fiber F. Part (A) shows a step of measuring wavelength dependence of the power of transmitted light of all modes. Part (B) is a step of measuring wavelength dependence of the power of transmitted light from which a high-order mode is eliminated. Part (C) shows a step of measuring wavelength dependence of the power of light launched to the optical fiber F. For the evaluation method for cut-off wavelength, a single-mode reference method and a multimode reference method are used. The evaluation device 6 includes a light source 10, a light measurement unit 20, a single-core dummy fiber 43B that launches light from the light source 10 to an optical fiber F to be evaluated, and a single-core dummy fiber 44B that receives light from the optical fiber F and outputs the light to the light measurement unit 20. The single-core dummy fibers 43B and 44B are both multimode fibers, allow light to be launched to all modes (including a mode having large transmission loss and hence to be effectively cut off) of the optical fiber F, and allow light to be received from all modes. The single-core dummy fibers 43B and 44B are joined to the optical fiber F by outer-diameter alignment.

The light source 10 is not particularly limited. For example, a broadband light source such as a halogen lamp or a wavelength tunable laser may be used. Also, a wavelength tunable transmission filter and a broadband light source may be combined and serve as a wavelength tunable light source. When the wavelength tunable light source is employed as the light source 10, an optical power meter may be used for the light measurement unit 20. Also, when the broadband light source is employed as the light source 10, an optical spectrum analyzer (OSA) may be used for the light measurement unit 20.

In the single-mode reference method and the multimode reference method, as shown in part (A), measurement light is output from the light source 10, and is launched to the optical fiber F through the single-core dummy fiber 43B on the input side. Then, wavelength dependence of a power P1 [dBm] of light reaching the light measurement unit 20 from the optical fiber F through the single-core dummy fiber 44B on the light receiving side is measured. At this time, the optical fiber F is provided in a state for evaluating cut-off wavelength (the fiber length, the bending state of the fiber, whether the fiber is in a cable form or not).

In the single-mode reference method, as shown in part (B), a bending C2 is applied to the state in which P1 is measured, and wavelength dependence of a power P2 [dBm] of light reaching the light measurement unit 20 from the optical fiber F through the single-core dummy fiber 44B on the light receiving side is measured. The bending C2 is sufficiently small to filter a high-order mode other than a propagation mode by bending loss in the optical fiber F. While the standard radius of the bending C2 in this case is about 30 mm, the radius may be preferably set as appropriate in accordance with the structure of the fiber.

A loss difference P1–P2 has a value around 0 in a wavelength band (on the long wavelength side) in which the high-order mode other than the propagation mode is cut off; however, the loss difference increases when the high-order mode is more guided as the wavelength decreases. At this time, a wavelength with which the loss difference P1–P2 becomes a predetermined value can be evaluated as a cut-off wavelength. In a case of a typical single-mode fiber, the predetermined value is 0.1 dB. However, in a coupled MCF, a smaller value may be set. In this case, the predetermined value may be preferably set to allow the loss difference between the high-order mode and the propagation mode is 19.3 dB.

In the multimode reference method, as shown in part (C), measurement light is output from the light source 10, and is launched through the single-core dummy fiber 43A on the input side to a single-core multimode fiber (SCMMF) 50 being short (about 1 m to 2 m). Then, wavelength dependence of a power P3 [dBm] of light reaching the light measurement unit 20 from the single-core multimode fiber through the single-core dummy fiber 44B on the light receiving side is measured. Alternatively, the single-core dummy fiber 43A on the input side may be directly joined to the single-core dummy fiber 44B on the light receiving side without through the single-core multimode fiber 50, and the power of the light reaching the light measurement unit 20 may be measured as the optical power P3.

Wavelength dependence of a loss difference P3–P1 can be regressed to a certain line in a wavelength band (on the long wavelength side) in which a high-order mode other than the propagation mode is cut off, and the loss difference P3–P1 takes a value near the line. However, when the high-order mode is more guided as the wavelength decreases, the loss difference P3–P1 separates from the line and increases more than the loss difference on the line. At this time, a wavelength with which the difference between the loss difference on the line and the loss difference P3-P1 becomes a predetermined value can be evaluated as a cut-off wavelength. In a case of a typical single-mode fiber, the predetermined value is 0.1 dB. However, in a coupled MCF, a smaller value may be set. In this case, the predetermined value may be preferably set to allow the loss difference between the high-order mode and the propagation mode is 19.3 dB.

As described above, in the optical fiber evaluation method and the optical fiber evaluation device according to the present invention, the single-core dummy fiber is aligned with the optical fiber to be measured (coupled MCF) by so-called outer-diameter alignment with reference to the circumferences of the claddings of both the fibers. Accordingly, the above-described fiber evaluation device can evaluate the performance of the coupled MCF without core alignment.

The above-described optical fiber evaluation method and optical fiber evaluation device each can preferably evaluate an optical characteristic of a coupled MCF including a plurality of cores and a cladding, one of the plurality of cores being arranged as a center core at the center of the cladding, the total number of spatial modes being the number of the plurality of cores or greater, (a fiber length)×(a power coupling coefficient between the cores)

being 10 or greater. That is, regarding the optical fiber F to be measured, the center core F1 is provided at the center of the cladding FC, and hence the center core F1 can be joined to the core of the single-core dummy fiber only by outer-diameter alignment.

Also, since the number of spatial modes in the optical fiber F to be measured is equal to or greater than the number of cores, the optical fiber F to be measured can be joined to the single-core dummy fiber of single-mode guide with small loss. If the number of spatial modes of the optical fiber F is smaller than the number of the plurality of cores, even though the center core of the optical fiber F and the core of the single-core dummy fiber have the same structure, mismatch occurs between the electric field distribution of the mode that treats the plurality of cores of the optical fiber F as a waveguide structure and the electric field distribution of the mode of the single-core dummy fiber, resulting in an increase in joint loss. If the number of spatial modes of the optical fiber F is equal to or greater than the number of the plurality of cores, the electric field distribution of the mode of the single-core dummy fiber matches with one of the plurality of modes that treats the plurality of cores of the optical fiber F as the waveguide structure. Accordingly, the joint loss can be reduced. At this time, the absolute value $$2|(MFD_F - MFD_1)|/(MFD_F + MFD_1)$$

of the ratio of the difference between the mode field diameter $MFD_F$ of a core mode (an imaginary spatial mode based on an assumption that only one core is present) and the mode field diameter $MFD_1$ of the single-core dummy fiber is preferably 0.1 or smaller, more preferably 0.05 or smaller, and further preferably 0.01 or smaller.

Also, since (the fiber length)×(the power coupling coefficient between the cores)

of the optical fiber F to be measured is 10 or greater, power coupling is sufficiently obtained between the cores by a propagation length of about 1/10 to the total length of the optical fiber. Even when an optical characteristic is evaluated by an input to a single mode, the optical characteristic as an average value of all modes can be efficiently evaluated. In contrast, for example, if (the fiber length)×(the power coupling coefficient between the cores)

is smaller than 1, the power between modes is not sufficiently mixed even at the output end after light propagates by the total length of the fiber, the value of the optical characteristic that can be evaluated is not the average value of all modes, but is a value deviated to the value of the launch mode.

It is to be noted that the optical fiber evaluation method and the optical fiber evaluation device according to the present invention are not limited to the above-described embodiment. For example, the above-described combination of the light source 10 and the light measurement unit 20 is merely an example, and may be selected as appropriate. Also, for the other optical components included in the evaluation device, the configurations of the optical components can be modified as appropriate.

What is claimed is:

1. An optical fiber evaluation method that evaluates an optical characteristic of a coupled multi-core optical fiber including a plurality of cores and a common cladding, one of the plurality of cores being arranged as a center core at the center of the cladding, a total number of spatial modes being a number of the plurality of cores or greater, (a fiber length)×(a power coupling coefficient between the cores)

being 10 or greater, the method comprising:

arranging a first dummy fiber such that one end of the first dummy fiber faces one end of the coupled multi-core optical fiber, the first dummy fiber including a cladding having a shape and a dimension being the same as a shape and a dimension of the cladding of the coupled multi-core optical fiber, and a core at the center of the cladding;

aligning the coupled multi-core optical fiber and the first dummy fiber with each other with reference to a circumference of the cladding of the coupled multi-core optical fiber and a circumference of the cladding of the first dummy fiber;

joining the coupled multi-core optical fiber and the first dummy fiber to each other while the center core of the coupled multi-core optical fiber faces the core of the first dummy fiber; and launching light from a light source to the coupled multi-core optical fiber joined to the first dummy fiber, and measuring light passing through the first dummy fiber and the coupled multi-core optical fiber with a light measurement unit.

2. The optical fiber evaluation method according to claim 1,
wherein the first dummy fiber is a single-mode fiber, and wherein the method comprises:
joining one end of a second dummy fiber to another end of the coupled multi-core optical fiber, the second dummy fiber being another single-mode fiber including a cladding having a shape and a dimension being the same as the shape and the dimension of the cladding of the coupled multi-core optical fiber, and a core at the center of the cladding;
measuring a transmission spectrum of the center core in the coupled multi-core optical fiber by launching the light from the light source to the coupled multi-core optical fiber through the first dummy fiber and measuring light from the coupled multi-core optical fiber through the second dummy fiber with the light measurement unit; and
evaluating mode dispersion of the coupled multi-core optical fiber by analyzing the transmission spectrum.

3. The optical fiber evaluation method according to claim 2,
wherein the light that is launched to the coupled multi-core optical fiber joined to the first and second dummy fibers is a single polarized wave, and
wherein the method comprises measuring, with the light measurement unit, a transmission spectrum of a single polarized wave of the center core in the coupled multi-core optical fiber by causing the light from the coupled multi-core optical fiber joined to the second dummy fibers to pass through a polarizing filter or a polarizing splitter.

4. The optical fiber evaluation method according to claim 1,
wherein the first dummy fiber is a single-mode fiber, and the one end of the coupled multi-core optical fiber is an end to which the light from the light source is launched, and
wherein the method comprises:
joining one end of a second dummy fiber to another end of the coupled multi-core optical fiber, the second dummy fiber being a multimode fiber including a cladding having a shape and a dimension being the same as a shape and a dimension of the cladding of the coupled multi-core optical fiber, and a core at the center of the cladding, the core having a greater radius than a maximum value of a distance between a circumference of a core provided at an outermost side and the center of the cladding in the coupled multi-core optical fiber; and
evaluating loss of the coupled multi-core optical fiber by launching the light from the light source to the coupled multi-core optical fiber through the first dummy fiber and measuring light from the coupled multi-core optical fiber through the second dummy fiber with the light measurement unit.

5. The optical fiber evaluation method according to claim 1,
wherein the method comprises evaluating chromatic dispersion of the coupled multi-core optical fiber by launching light with a wavelength swept or light modulated with a predetermined frequency to the coupled multi-core optical fiber joined to the first dummy fiber, measuring light from the coupled multi-core optical fiber with the light measurement unit, and measuring wavelength dependence of a group delay in the coupled multi-core optical fiber.

6. The optical fiber evaluation method according to claim 1,
wherein the first dummy fiber is a single-mode fiber,
wherein another end of the coupled multi-core fiber is open end, and
wherein the method comprises evaluating backscattering of the coupled multi-core optical fiber by launching the light from the light source to the coupled multi-core optical fiber joined to the first dummy fiber through the first dummy fiber and measuring light from the coupled multi-core optical fiber with the light measurement unit through the first dummy fiber.

7. The optical fiber evaluation method according to claim 1,
wherein the alignment between the coupled multi-core optical fiber and the first dummy fiber is performed by mating an end surface of the coupled multi-core optical fiber and an end surface of the first dummy fiber with each other while the coupled multi-core optical fiber and the first dummy fiber are arranged in a V-groove.

8. The optical fiber evaluation method according to claim 7,
wherein the first dummy fiber is a single-mode fiber, and wherein the method comprises:
joining one end of a second dummy fiber to another end of the coupled multi-core optical fiber, the second dummy fiber being another single-mode fiber including a cladding having a shape and a dimension being the same as the shape and the dimension of the cladding of the coupled multi-core optical fiber, and a core at the center of the cladding;
measuring a transmission spectrum of the center core in the coupled multi-core optical fiber by launching the light from the light source to the coupled multi-core optical fiber through the first dummy fiber and measuring light from the coupled multi-core optical fiber through the second dummy fiber with the light measurement unit; and
evaluating mode dispersion of the coupled multi-core optical fiber by analyzing the transmission spectrum.

9. The optical fiber evaluation method according to claim 8,
wherein the light that is launched to the coupled multi-core optical fiber joined to the first and second dummy fibers is a single polarized wave, and wherein the method comprises measuring, with the light measurement unit, a transmission spectrum of a single polarized wave of the center core in the coupled multi-core optical fiber by causing the light from the coupled multi-core optical fiber joined to the second dummy fibers to pass through a polarizing filter or a polarizing splitter.

10. The optical fiber evaluation method according to claim 7, wherein the first dummy fiber is a single-mode fiber, and the one end of the coupled multi-core optical fiber is an end to which the light from the light source is launched, and wherein the method comprises:

joining one end of a second dummy fiber to another end of the coupled multi-core optical fiber, the second dummy fiber being a multimode fiber including a cladding having a shape and a dimension being the same as a shape and a dimension of the cladding of the coupled multi-core optical fiber, and a core at the center of the cladding, the core having a greater radius than a maximum value of a distance between a circumference of a core provided at an outermost side and the center of the cladding in the coupled multi-core optical fiber; and evaluating loss of the coupled multi-core optical fiber by launching the light from the light source to the coupled multi-core optical fiber through the first dummy fiber and measuring light from the coupled multi-core optical fiber through the second dummy fiber with the light measurement unit.

11. The optical fiber evaluation method according to claim 7, wherein the method comprises evaluating chromatic dispersion of the coupled multi-core optical fiber by launching light with a wavelength swept or light modulated with a predetermined frequency to the coupled multi-core optical fiber joined to the first dummy fiber, measuring light from the coupled multi-core optical fiber with the light measurement unit, and measuring wavelength dependence of a group delay in the coupled multi-core optical fiber.

12. The optical fiber evaluation method according to claim 7, wherein the first dummy fiber is a single-mode fiber, wherein another end of the coupled multi-core optical fiber is an open end, and wherein the method comprises evaluating backscattering of the coupled multi-core optical fiber by launching the light from the light source to the coupled multi-core optical fiber joined to the first dummy fiber through the first dummy fiber and measuring light from the coupled multi-core optical fiber with the light measurement unit through the first dummy fiber.

13. An optical fiber evaluation device that evaluates an optical characteristic of a coupled multi-core optical fiber including a plurality of cores and a common cladding, one of the plurality of cores being arranged as a center core at the center of the cladding, a total number of spatial modes being a number of the plurality of cores or greater, (a fiber length)×(a power coupling coefficient between the cores) being 10 or greater, the device comprising:

a light source;

a dummy fiber including a cladding having a shape and a dimension being the same as a shape and a dimension of the cladding of the coupled multi-core optical fiber, and a core at the center of the cladding; and a light measurement unit, wherein the dummy fiber is arranged such that one end of the dummy fiber faces one end of the coupled multi-core optical fiber, the coupled multi-core optical fiber and the dummy fiber are aligned with each other with reference to a circumference of the cladding of the coupled multi-core optical fiber and a circumference of the cladding of the dummy fiber, and the coupled multi-core optical fiber and the dummy fiber are joined to each other while the center core of the coupled multi-core optical fiber faces the core of the dummy fiber, and wherein light emitted from the light source is launched to the coupled multi-core optical fiber joined to the dummy fiber, and light passing through the dummy fiber and the coupled multi-core optical fiber is measured with the light measurement unit.

* * * * *